No. 858,483. PATENTED JULY 2, 1907.
G. H. TEFFT.
PIPE JOINT.
APPLICATION FILED JAN. 30, 1906.
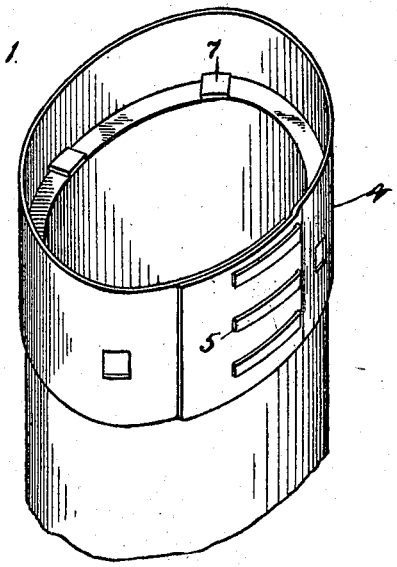
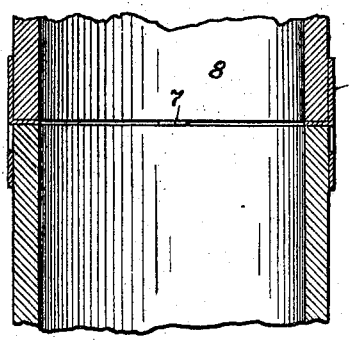
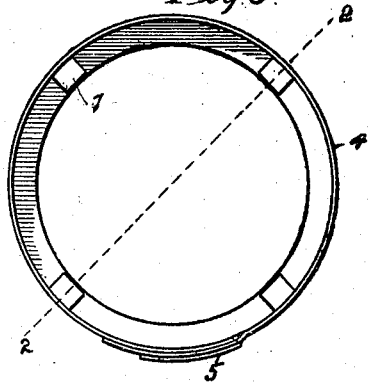
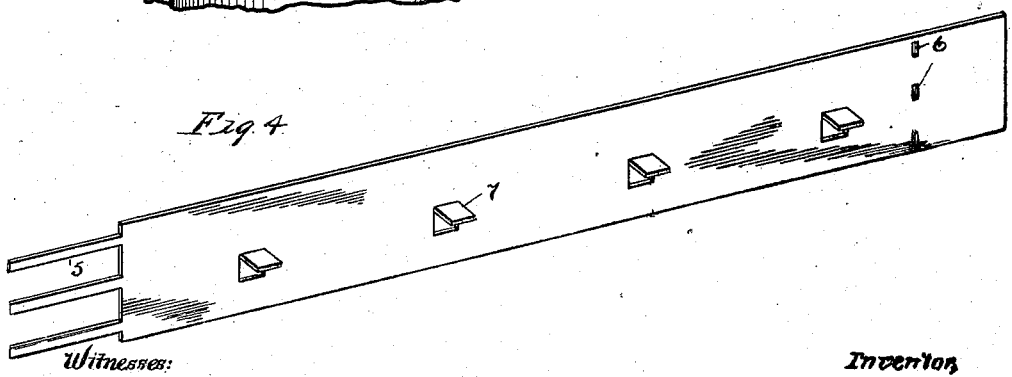
Witnesses:
R. E. Hamilton
John F. Wade.
Inventor,
George H. Tefft.
By
Arthur C. Brown
Atty.

UNITED STATES PATENT OFFICE.

GEORGE H. TEFFT, OF KANSAS CITY, MISSOURI.

PIPE-JOINT.

No. 858,483.  Specification of Letters Patent.  Patented July 2, 1907.

Application filed January 30, 1906. Serial No. 298,606.

*To all whom it may concern:*

Be it known that I, GEORGE H. TEFFT, a citizen of the United States, residing at Kansas City, in the county of Jackson and State of Missouri, have invented certain new and useful Improvements in Pipe-Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to a pipe joint, and more particularly to a joint for large iron or clay pipes used in the construction of various kinds of wells. In the construction of this kind of pipe it has been the custom to provide one end of each pipe with an annular socket flange adapted to receive the plain end of an abutting pipe when the two are laid together; the flange must be of sufficient thickness to withstand considerable strain and is usually of about the same thickness as the body of the pipe. When a pipe of this description is used in well construction it can readily be seen that the diameter of the hole into which the pipe is sunk must be considerably greater than the interior diameter of the pipe in order to permit the passage of the flange.

It is the object of my present invention to provide a pipe joint which will fit the ends of two abutting pipes and bind them snugly together, obviating the necessity for the socket flange and making it possible to set the same size pipe in a hole of less diameter than would ordinarily be necessary. In accomplishing this object I have provided the improved details of structure which will presently be fully described and pointed out in the claims, reference being had to the accompanying drawings forming part of this specification in which like reference numerals refer to like parts throughout the several views and in which—

Figure 1 is a perspective view of a pipe to which a joint constructed according to my invention has been secured. Fig. 2 is a central vertical section of a pair of pipes united by my improved joint, the view being taken on the relative line 2—2, Fig. 3. Fig. 3 is a top plan view of Fig. 1. Fig. 4 is a detail view of the blank from which the joint is formed.

The joint is preferably formed from a single piece of sheet metal, oblong in shape and provided at one end with a series of fingers 5 of suitable length and breadth.
6 are perforations in blank 4 a suitable distance from the end opposite fingers 5 which are adapted to receive said fingers. At suitable points throughout its length the blank is provided with lips 7 which project at right angles to the face of the blank and are preferably formed by stamping out three sides of a square and bending the cut out lip up on the fourth side. In applying the joint, the first pipe is set on end and the described blank bent around its upper end, the fingers being projected through perforations 6, and lips 7 resting on the top edge of the pipe; the second pipe 8 is then set on top of the first, within the joint, with its lower edge resting on lips 7; the fingers are then drawn tight and bent back as indicated in Figs. 1 and 3. When the pipes, thus joined, are sunk in the hole the joint is prevented from slipping along the pipes by the lips 7 which are held securely between the two sections. It has been found from experience that a joint thus formed is as satisfactory as that ordinarily used and will enable the pipes to be placed in a hole considerably less in diameter than would be necessary with the socket flange joint.

By placing the perforations some distance from the end of the blank and providing fingers of suitable length, the joint may be adjusted to fit pipes of different diameter, as can readily be seen by reference to the drawings.

While I have described my invention as applicable to iron and clay pipes for use in wells, its utility for other purposes is readily apparent.

Having thus described my invention, what I claim as new therein and desire to secure by Letters-Patent is—

1. A pipe joint blank, formed of a single piece of sheet metal, provided with suitable fastening means, and lips projecting from the body of the blank in longitudinal alignment and adapted for insertion between the ends of abutting pipes.

2. A pipe joint blank comprising suitable fastening means, and lips projecting at intervals from the body of the blank, all of said lips being in the same plane with each other and extending at a right angle to the body of the blank to engage the ends of abutting pipe sections.

3. A pipe joint blank formed from a single piece of sheet metal and provided with suitable fastening means, and lips stamped from the body of the blank, and adapted for insertion between the abutting ends of adjacent pipe sections, substantially as set forth.

4. The combination with a pair of abutting pipes, of a joint formed from a single piece of sheet metal bent around the abutting ends of said pipes, means for binding the joint on the pipes and lips stamped from the body of the blank, said lips being bent inwardly in longitudinal alignment and interposed between the abutting ends of said pipes, substantially as and for the purpose set forth.

In testimony whereof I affix my signature in presence of two witnesses.

GEORGE H. TEFFT.

Witnesses:
 JAMES E. FARIS,
 A. E. DICKEY.